(12) United States Patent
Flanders et al.

(10) Patent No.: US 7,324,569 B2
(45) Date of Patent: Jan. 29, 2008

(54) METHOD AND SYSTEM FOR SPECTRAL STITCHING OF TUNABLE SEMICONDUCTOR SOURCES

(75) Inventors: Dale C. Flanders, Lexington, MA (US); Walid A. Atia, Lexington, MA (US); Mark E. Kuznetsov, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 540 days.

(21) Appl. No.: 10/954,616

(22) Filed: Sep. 30, 2004

(65) Prior Publication Data

US 2006/0072112 A1    Apr. 6, 2006

Related U.S. Application Data

(63) Continuation-in-part of application No. 10/953,046, filed on Sep. 29, 2004, now Pat. No. 7,157,712.

(51) Int. Cl.
*H01S 3/10* (2006.01)
(52) U.S. Cl. .................... 372/20; 372/29.015
(58) Field of Classification Search .......... 372/20
See application file for complete search history.

(56) References Cited

U.S. PATENT DOCUMENTS

| | | | |
|---|---|---|---|
| 5,029,245 A | | 7/1991 | Keraenen et al. |
| 5,184,241 A | * | 2/1993 | Schwemmer ............ 398/93 |
| 6,339,603 B1 | | 1/2002 | Flanders et al. |
| 6,373,632 B1 | | 4/2002 | Flanders et al. |
| 6,608,711 B2 | | 8/2003 | Flanders et al. |
| 6,765,669 B1 | | 7/2004 | Pawluczyk |
| 6,865,196 B2 | * | 3/2005 | Dobbs et al. ............ 372/20 |
| 7,157,712 B2 | * | 1/2007 | Flanders et al. ........ 250/339.07 |
| 2001/0052978 A1 | | 12/2001 | Lewis et al. |

FOREIGN PATENT DOCUMENTS

DE    41 22 925 A1    1/1993
EP    0 707 202 A2    4/1996

OTHER PUBLICATIONS

International Preliminary Report on Patentability from International Application No. PCT/US2005/033714, filed Sep. 20, 2005.
U.S. Appl. No. 10/688,690, filed Oct. 17, 2003, Atia et al.
U.S. Appl. No. 10/953,046, filed Sep. 29, 2004, Flanders et al.

* cited by examiner

*Primary Examiner*—Dung (Michael) T. Nguyen
(74) *Attorney, Agent, or Firm*—Houston Eliseeva LLP (57) ABSTRACT

A multi semiconductor source tunable spectroscopy system has two or more semiconductor sources for generating tunable optical signals that are tunable over different spectral bands. The system enables the combination of these tunable signals to form an output signal that is tunable over a combined band including these individual spectral bands of the separate semiconductor sources. The system further compensates for spectral roll-off associated with the semiconductor sources. Specifically, near the limits of the semiconductor sources' spectral bands, the power in the tunable signal tends to degrade or decrease. The system compensates for this roll-off using drive current control, attenuators, or electronic compensation.

17 Claims, 8 Drawing Sheets

METHOD AND SYSTEM FOR SPECTRAL STITCHING OF TUNABLE SEMICONDUCTOR SOURCES

RELATED APPLICATIONS

This application is a continuation in part of to application Ser. No. 10/953,046, filed on Sep. 29, 2004, by Flanders, et al., now U.S. Pat. No. 7,157,712 which application is incorporated herein by this reference in its entirety.

BACKGROUND OF THE INVENTION

A number of general configurations are used for tunable source spectroscopy systems. The lasers have advantages in that very intense tunable optical signals can be generated. A different configuration uses the combination of a broadband source and a tunable passband filter, which generates the narrowband signal that illuminates the sample.

Historically, most tunable lasers were based on solid state gain media. While often powerful, these systems typically have high power consumptions. In contrast, tunable semiconductor laser systems have the advantage of relying on small, efficient, and robust semiconductor sources. One configuration uses semiconductor optical amplifiers (SOAs) and microelectromechanical system (MEMS) Fabry-Perot tunable filters, as described in U.S. Pat. No. 6,339,603, by Flanders, et al., which is incorporated herein by this reference in its entirety.

In commercial examples of the broadband source/tunable filter tunable source configuration, the tunable filter is an acousto-optic tunable filter (AOTF) and the broadband signal is generated by a diode array or tungsten-halogen bulb, for example. More recently, some of the present inventors have proposed a tunable source that combines superluminescent light emitting diodes (SLEDs) and a MEMS Fabry-Perot tunable filter to generate the tunable optical signal. See U.S. patent appl. Ser. No. 10/688,690, filed on Oct. 17, 2003, by Atia, et al., which is incorporated herein by this reference in its entirety. The MEMS device is highly mechanically and spectrally stable and can handle high powers and can further be much smaller and more energy-efficient than typically large and expensive AOTFs. Moreover, the SLEDS can generate very intense broadband optical signals over large bandwidths, having a much greater spectral brightness than tungsten-halogen sources, for example.

One drawback associated with semiconductor spectroscopy systems, however, is limited spectral width. Often a single semiconductor chip is not available that can cover the entire desired scan band.

As a result, a number of tunable semiconductor source have been proposed that are based on using the emission from multiple SLED's or SOA chips in the context of tunable SLED or tunable laser devices.

SUMMARY OF THE INVENTION

The present invention is directed to a multi semiconductor source tunable spectroscopy system. It has two or more semiconductor sources for generating tunable optical signals that are tunable over different spectral bands. The system enables the combination of these tunable signals to form an output signal that is tunable over a combined band including these individual spectral bands of the separate semiconductor sources.

Critical to the invention, however, is a system for compensating for spectral roll-off associated with the semiconductor sources. Specifically, near the limits of the semiconductor sources' spectral bands, the power in the tunable signal tends to degrade or decrease. The present invention compensates for this roll-off.

In general, according to one aspect, the invention features a multi semiconductor source tunable spectroscopy system. This system comprises at least two semiconductor sources for generating tunable optical signals. These optical signals are tunable over different spectral bands, but combined into an output signal that is tunable over a combined scan band.

A control system compensates for the spectral roll-off of the at least two semiconductor sources over the combined scan band. In this way, the system can produce an effectively wider scan band by combining the output from two semiconductor sources, without incurring penalities associated with available power in the tunable optical signals near the limits of the spectral bands of the separate semiconductor sources.

In one embodiment, the control system comprises at least one optical signal regulator for controlling an amplitude of the output signal over the combined scan band of the system.

In another embodiment, the control system comprises at least one source driver circuit for controlling an amplitude of the output signal over the scan band of the system by regulating the drive current to the semiconductor sources.

In still another embodiment, the control system comprises an output signal detector for detecting the output signal before interaction with a sample. A controller then corrects a sample signal, which is produced by interaction of the output signal with the sample, in response to spectral roll-off detected by the output signal detector. This controller can be implemented as a digital, analog, or hybrid digital/analog control circuit.

In one embodiment, the semiconductor sources are light emitting diodes, such as superluminescent light emitting diodes (SLED), generating broadband signals. The broadband signals are converted to the tunable signals by at least one tunable filter.

In other embodiments, the semiconductor sources are lasers comprising laser cavities. The semiconductor optical amplifier (SOA) chips are located within the cavities with tunable filters. Depending on the implementation, the cavities can be linear or ring configurations.

In the preferred embodiment, the diodes, e.g., SLED or SOA, and the tunable filters are implemented on a bench. In one embodiment, one diode and one filter are implemented in common on a single bench. In other embodiments, all of the tunable filters and diodes are integrated together on a common bench. In the preferred embodiment, the tunable filter is a micro-electromechanical system (MEMS) Fabry-Perot tunable filter.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
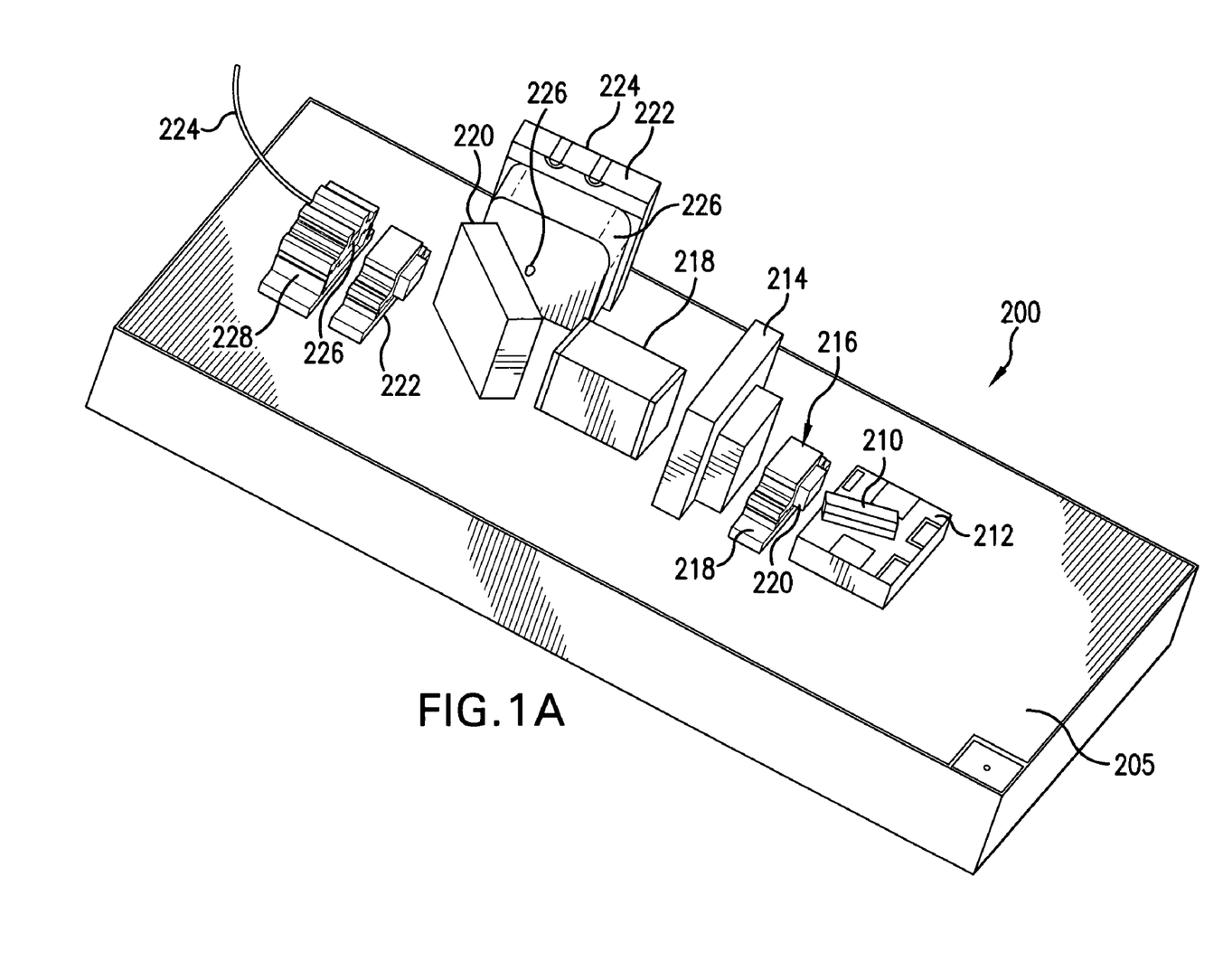
FIG. 1A is a perspective view of a tunable SLED source with a wavelength referencing system, to which the present invention is applicable.
Figure 1B:
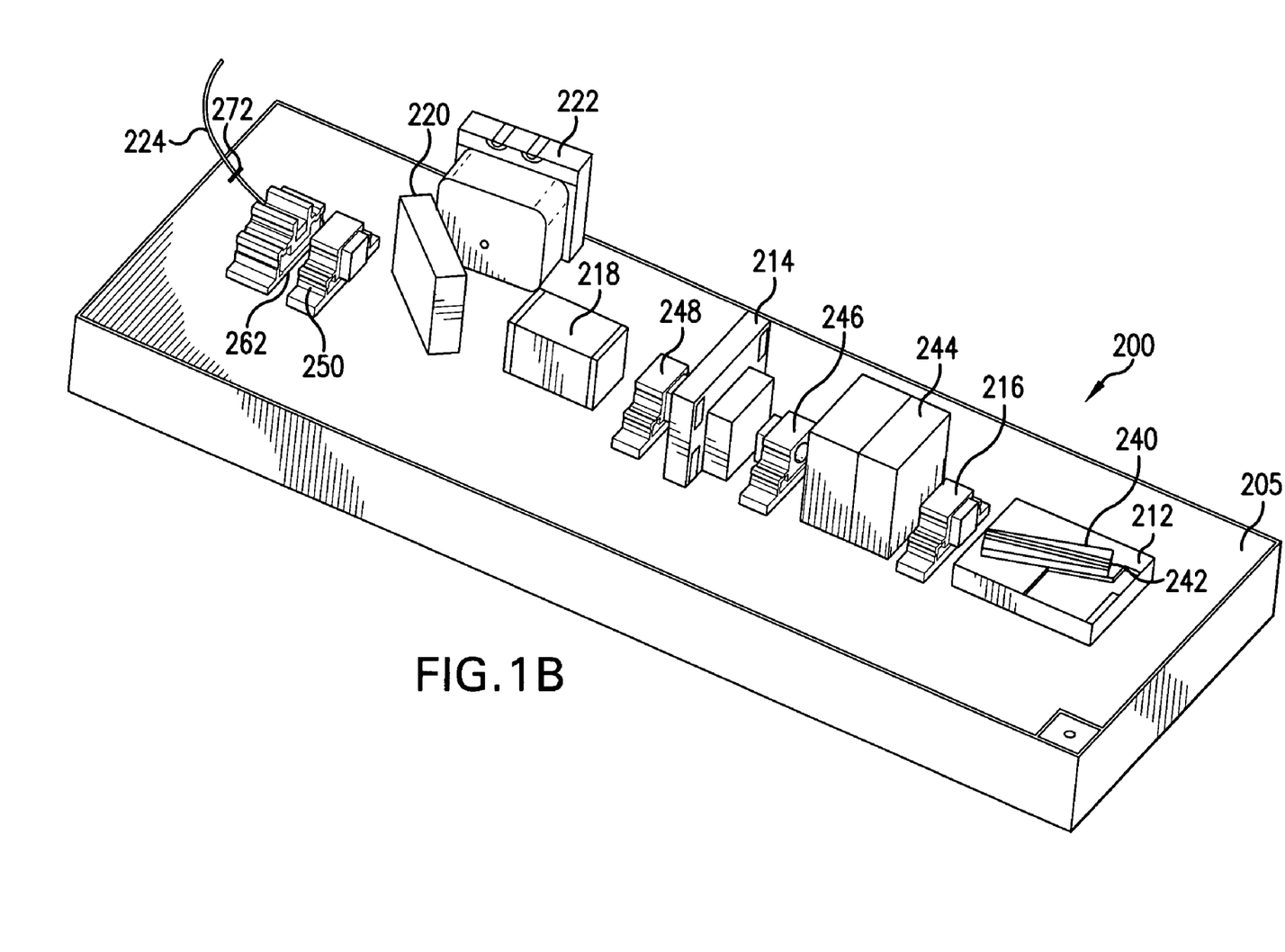
FIG. 1B is perspective view of a semiconductor tunable laser (linear cavity) source with a wavelength referencing system, to which the present invention is applicable.
Figure 1C:
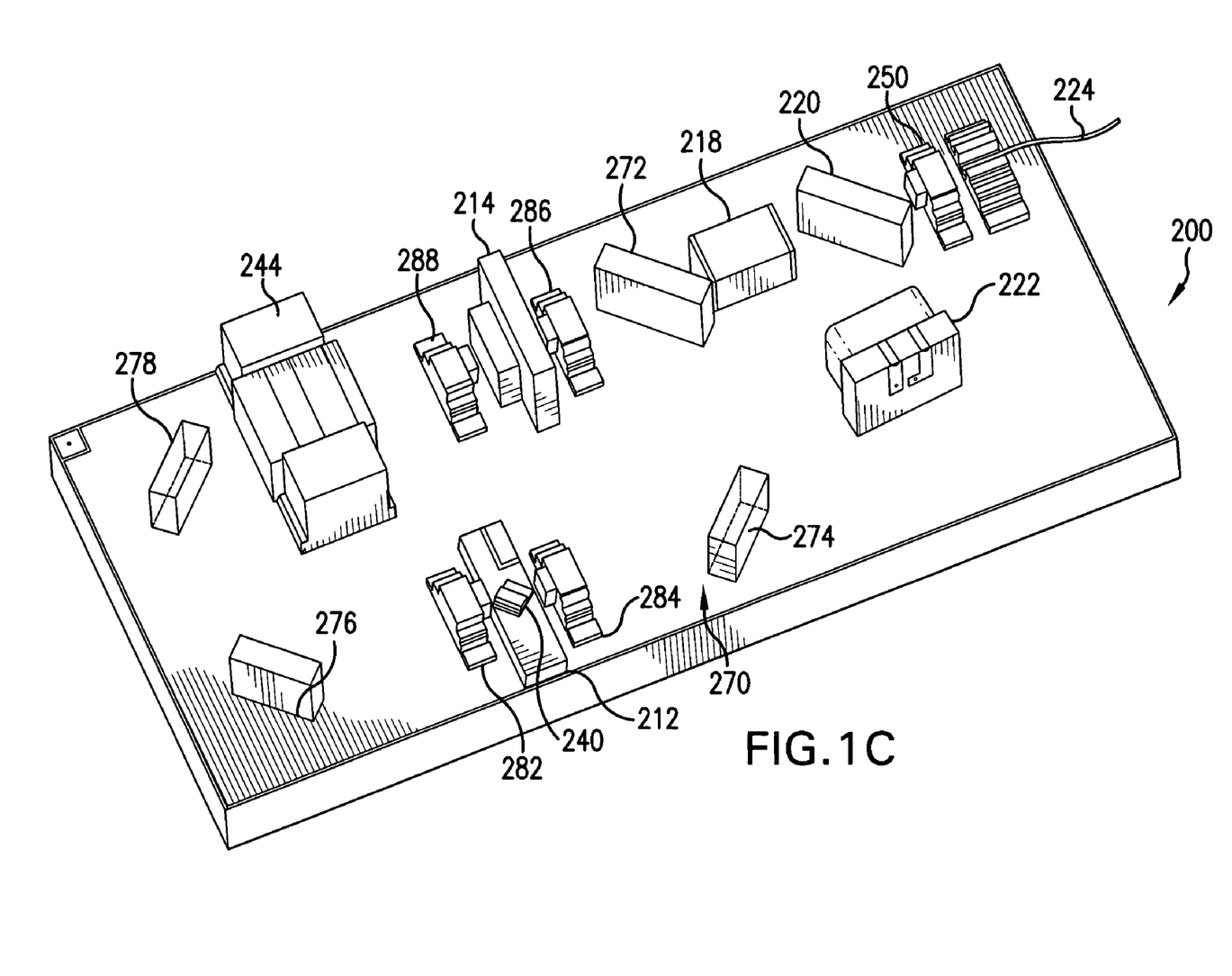
FIG. 1C is perspective view of a semiconductor tunable laser (ring cavity) source with a wavelength referencing system, to which the present invention is applicable

FIGS. 1A through 1C illustrate various embodiments of the semiconductor sources that are preferably used in the multi semiconductor source tunable spectroscopy system according to the present invention.

Specifically, FIG. 1A shows a tunable superluminescent light emitting diode (SLED) semiconductor tunable source 200.

In more detail, the tunable SLED 200 comprises a diode, specifically SLED, chip 210. This SLED chip 210 is an edge-emitting device that is installed on a submount 212 that supports the SLED chip 210 over an optical bench 205.

The broadband optical signal produced by the SLED chip 210 is collimated by a lens optical component 216. In the illustrated embodiment, the lens optical component 216 includes a mounting structure 218 and a lens element substrate 220, in which the optically curved surface of the lens is formed.

The use of this mounting structure 218 allows for post installation alignment of the lens element 220 with respect to the SLED chip 210 and the source's optical train, generally.

The broadband signal from the SLED chip 210 is converted to a narrowband, tunable optical signal by a tunable filter 214. In the present embodiment, the tunable filter 214 is a microelectrical mechanical system (MEMS) Fabry Perot tunable filter. Curved-flat or flat-flat Fabry-Perot cavities are preferably used. In one example, the Fabry-Perot tunable filter is manufactured as described in U.S. Pat. No. 6,608,711 or 6,373,632, which are incorporated herein by this reference.

The tunable signal, on exiting from the tunable filter 214, is then coupled through an optional optical signal regulator 218. In the preferred embodiment, this regulator controls the amplitude of the tunable optical signal.

In one embodiment, this tunable optical signal regulator 218 is an amplifier or other controlled gain element. In the present embodiment, the tunable optical signal regulator 218 is a tunable attenuator. Preferably, it is a solid state, ceramic, high-speed optical attenuator. One commercial example is provided by Boston Applied Technologies, Inc. These are ceramic devices that are electrically modulated in order to control the level of the attenuation applied to the tunable signal.

A beam splitter 220 diverts a portion of the signal to a source detector 222. This comprises a detector chip 224 and a windowing element 226 that prevents a stray light from being received at the detector substrate 224 by ensuring that only columnated light reaches the detector substrate 224 via an optical port 226.

The light that is not diverted by the tap 220 is then focused by a second lens component 222 into an optical fiber 224, which carries the light to the sample. In the preferred embodiment, the endface 226 of the optical fiber 224 is secured to the optical bench 205 by a fiber mounting structure 228, which again allows for the post installation alignment of the optical fiber end-face in order to maximize the coupling efficiency of the optical train.

FIG. 1B illustrates a second embodiment of the tunable semiconductor source 200. In this embodiment, the tunable semiconductor source 200 again comprises an optical bench 205.

Instead of the SLED chip, however, a semiconductor optical amplifier (SOA) chip 240 is used as the semiconductor gain medium. This chip is also secured to the bench 205 via a submount 212.

In the illustrated embodiment, the SOA chip 240 is a reflective SOA. Specifically, the SOA chip's back facet 242 has a reflective coating in order to function as a back reflector of the laser cavity of the semiconductor source 200.

Light exiting from the SOA chip 240 is columnated by a first lens component 216. It passes through an isolator at 244 to a second lens component 246 and then to a tunable filter 214.

The filter 214 functions to control which of the longitudinal optical nodes have a net gain in the laser cavity of the laser tunable semiconductor tunable source 200.

Light exiting from the filter 214 is collimated by a third lens component 248.

In other embodiments, more or less isolators 244 are used in the laser cavity.

Specifically, in one example, the tunable laser source has no isolators. Instead, the Fabry Perot tunable filter 214 is angled with respect to the optical axis of the laser cavity in order to provide tilt isolation. In one implementation, the angling of the Fabry Perot tunable filter is relatively small between one and five degrees. As a result, light that is rejected by the Fabry Perot tunable filter is being out of its passband is not coupled back into the laser cavity in order to be amplified by the SOA gain chip 240. In other example, additional isolators are used to prevent back reflections to the gain chip.

Light passes through an optical signal regulator 218, as described previously.

The light then passes through a tap 220 that diverts part of the optical signal to the source detector 222. The remaining signal is coupled into the optical fiber 224 via a fourth lens component 250.

In one embodiment, the mirror 272 defining the end of the cavity is located in the fiber 224. In other examples, the mirror is located between the regulator 218 and the filter 214, thus placing the regulator 218 and the detector 222 outside of the laser cavity.

FIG. 1C shows still another example of the semiconductor tunable source 200. This is also a laser configuration. Instead of a linear cavity, however, it uses a ring laser cavity 270. Specifically, a ring cavity is defined by mirrors 272, 274, 276, and 278. An isolator 244 is located in the ring laser cavity in order to ensure that light travels in only one direction through the ring. Mirror 272 is partially reflective in order to provide a portion of the optical signal circulating in the ring cavity as a tunable output signal.

A SOA chip 240 provides the gain in the laser cavity 270. Tunable filter 214 again controls which longitudinal modes of the laser cavity have net gain.

Four lens components 282, 284, 286, and 288 provide coupling into and out of the tunable filter 214 and the SOA gain chip 240. An optical signal regulator 218, such as a tunable attenuator, is provided at the output of the ring cavity 270. A tap 220 is also provided in one embodiment to couple part of the tunable optical signal to the source detector 222. A lens component 250 couples the remaining light into the optical fiber at 224 that conveys the light to the sample.

Figure 2:
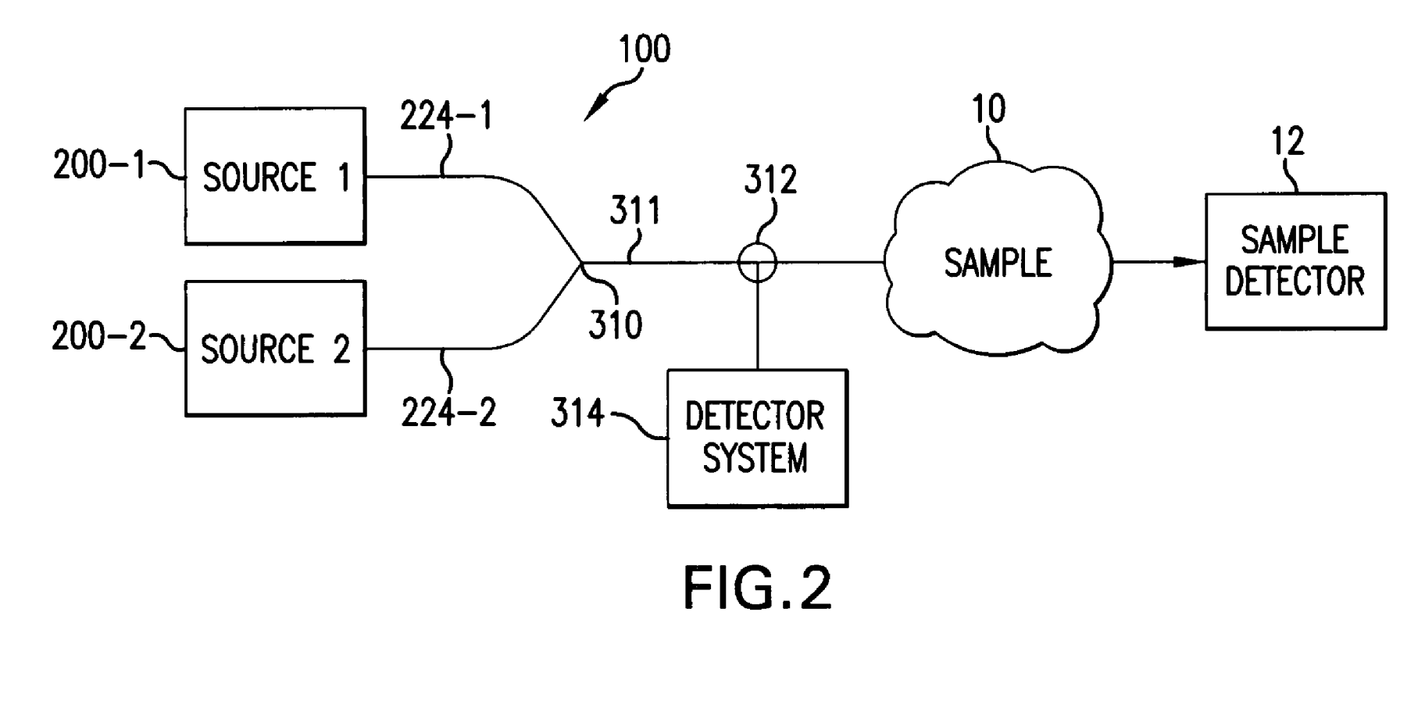
FIG. 2 is a block diagram of a multi semiconductor tunable source spectroscopy system, to which the present invention is applicable.

FIG. 2 illustrates the use of the tunable semiconductor sources 200 illustrated in FIGS. 1A through 1C in the construction of a multi semiconductor tunable source spectroscopy system 100. Specifically, two semiconductor sources 200-1, 200-2 (source 1, source 2) produce tunable signals covering different spectral bands on optical paths or fibers 224-1, 224-2. These are combined to produce an output signal on path or fiber 311 via a combiner 310. In one embodiment, the combiner 310 is a fiber coupler. In other embodiments, the combiner is implemented on an optical bench using polarization filters or a spectral, dichroic filters, for example.

The output signal on fiber 311 has a combined scan band that combines the different spectral bands of the two semiconductor sources 200-2, 200-2. In this way, it has a combined scan band that enables scanning over a broader scan band than could be obtained from the sources 200-1, 200-2 individually.

In one embodiment, this output signal on fiber 311 is conveyed by an output signal coupler 312 to an output signal detector 314. The remaining output signal is conveyed to a sample 10 and then detected by a sample detector 12.

Figure 3:
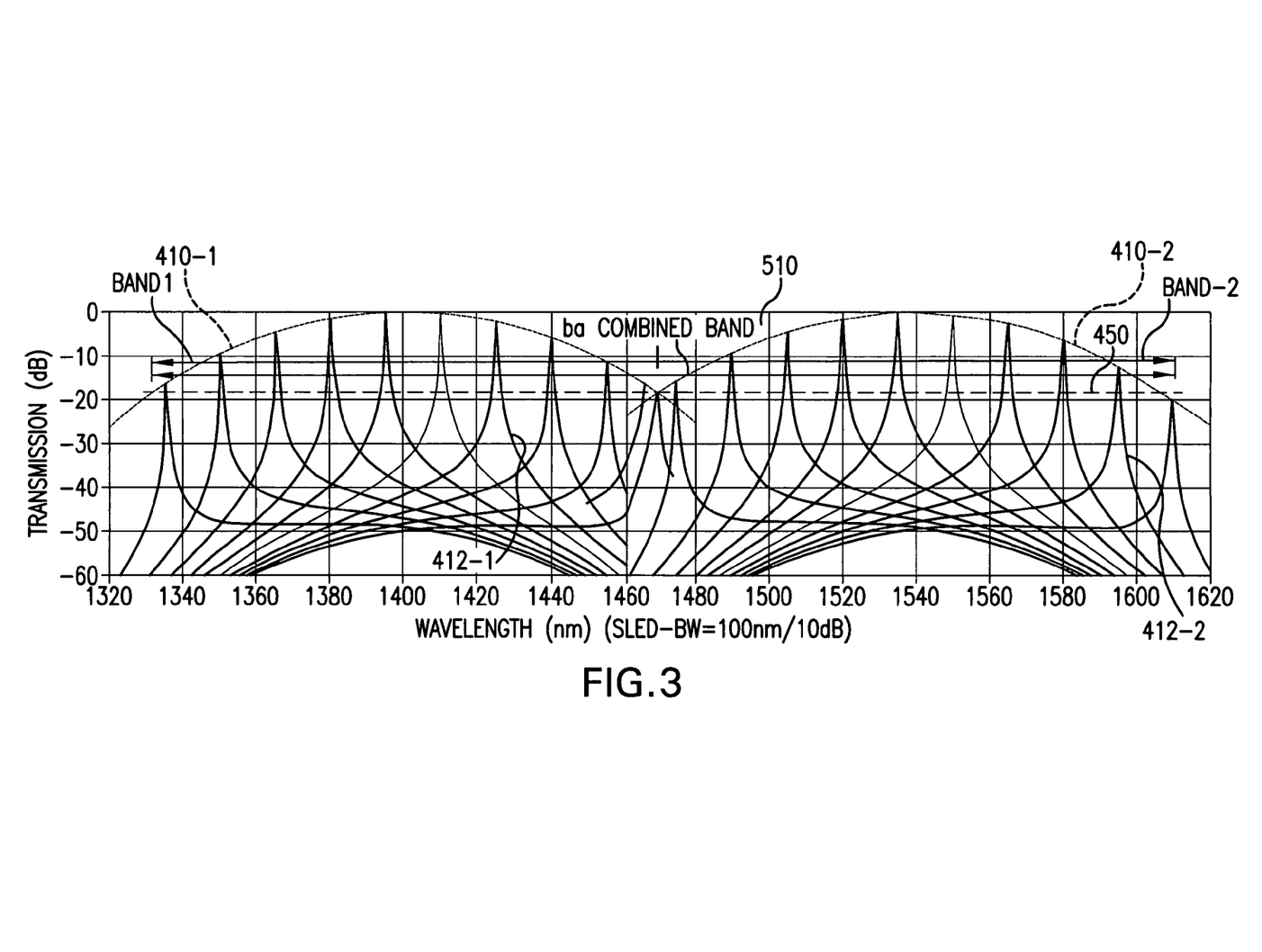
FIG. 3 shows the overlapping gain spectrums for various semiconductor chips and the mode or passband selection provided by the tunable filter.

FIG. 3 illustrates the spectral roll-off that is characteristic of the semiconductor sources 200. Overlaid onto the source spectra 410-1, 410-2 are the tunable filters' passbands 412-1 and 412-2 for each of the sources 200-1, 200-2.

Specifically, the semiconductor chips potentially emit in corresponding bands 410-1 and 410-2. The tunable filter passbands 412-1, 412-2 will filter out or block the other regions of the spectrums 410-1, 410-2 in the case of the tunable SLED sources (FIG. 1A) or constrain the source to only emit light generated by the optical modes within the passbands 412-1, 412-2 in the case of the tunable laser sources (FIGS. 1B and 1C).

The sources 200-1, 200-2 cover different spectral bands. For example tunable source 200-1 covers band band-1 stretching from approximately 1330 to 1470 nanometers (nm). In contrast, source 2 200-2 covers band-2 stretching from approximately 1470 to 1610 nanometers. By combining the output of these two semiconductor sources, a combined scan band stretching from approximately 1330 to 1610 nanometers is achieved.

However, the tunable signals varies in amplitude by approximately 20 decibels dB over this range due to the gain spectrums 410-1 and 410-2 associated with the separate sources 200-1, 200-2. Specifically, these gain bands 410-1, 410-2 suffer substantial roll-off near the limits of the associated semiconductor sources such that it causes changes in the amplitude of the resulting output signal which can impact the analysis of the spectral response of the sample 10.

Figure 4:
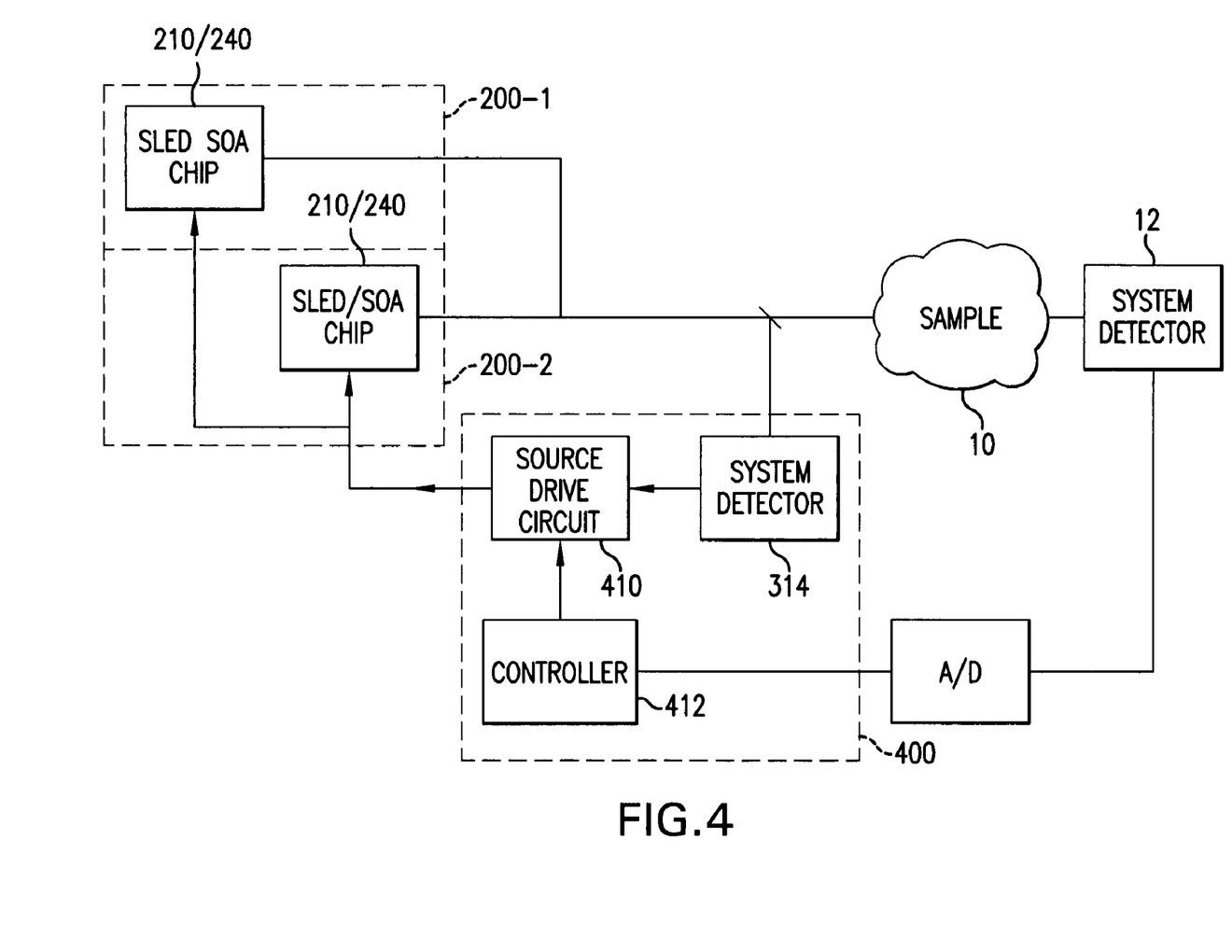
FIG. 4 shows spectral stitching system for a semiconductor source spectroscopy system according to a first embodiment of the present invention, utilizing drive current feedback control of the semiconductor sources.

FIG. 4 illustrates a first embodiment control system for compensating for the spectral roll-off of the at least two semiconductor sources, e.g., SLED sources 210 or SOA sources 240, over the combined scan band provided by the combination of the tunable signals from the two semiconductor sources 200-1, 200-1.

Specifically, source one 200-1 is driven by a source drive circuit of a control system 400 including a system detector 314 and a controller 412. In other embodiments, instead of using the system detector 314, the source detectors 224 are used to sample the magnitude of the signals produced by the sources 200-1, 200-2.

The source drive circuit 410 controls the current to the diode chips, e.g., SLED chips 210 of the tunable SLED of FIG. 1A, or SOA chips 240 of the tunable lasers of FIG. 1B, 1C. The modulation of the drive current maintains the levels of the respective tunable signals at a fixed level such as level 450 of FIG. 3. Specifically, near the limits of the scan band, the power or drive current to the chips 210/240 in the sources 200-1, 200-2 is increased in order to achieve a stable level to the output signal across the entire combined scan band.

Figure 5:
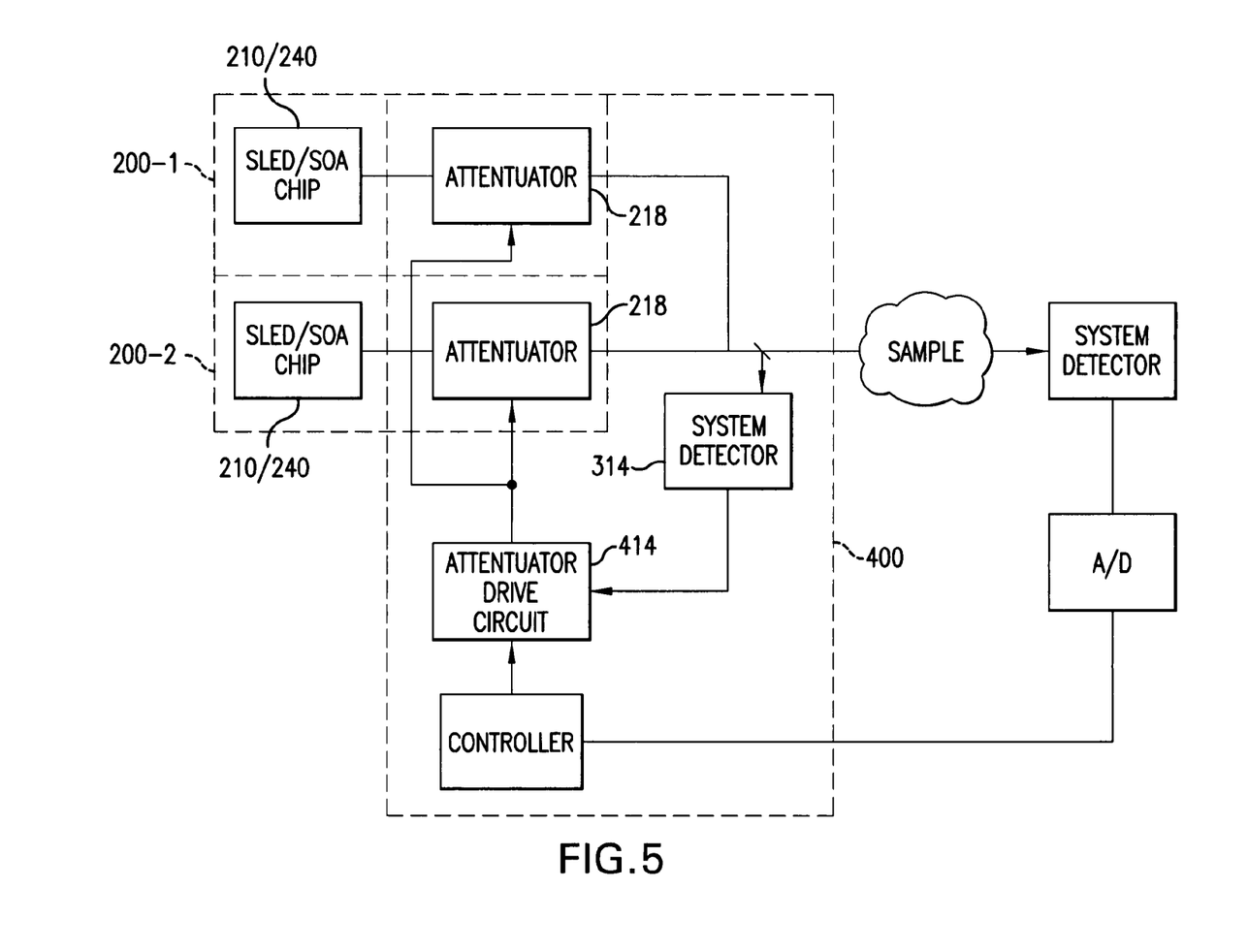
FIG. 5 shows spectral stitching system for a semiconductor source spectroscopy system according to a second embodiment of the present invention, utilizing optical signal regulator control of the tunable optical signal.

FIG. 5 illustrates a second embodiment of the control system 400. Here the control system comprises the attenuators or optical signal regulators 218 of the sources 200-1, 200-2. Specifically, the system detector 314 or alternatively the source detectors 224 are used to sample the level of the output signal or the tunable signals from the separate sources at 200-1, 200-2. Then, an attenuator drive circuit 414 of the system controller 400 is used to drive the attenuators 218 in order to attenuate the separate tunable optical signals in order to achieve a stable level 450 to the output signal across the entire combined scan band 510.

Figure 6:
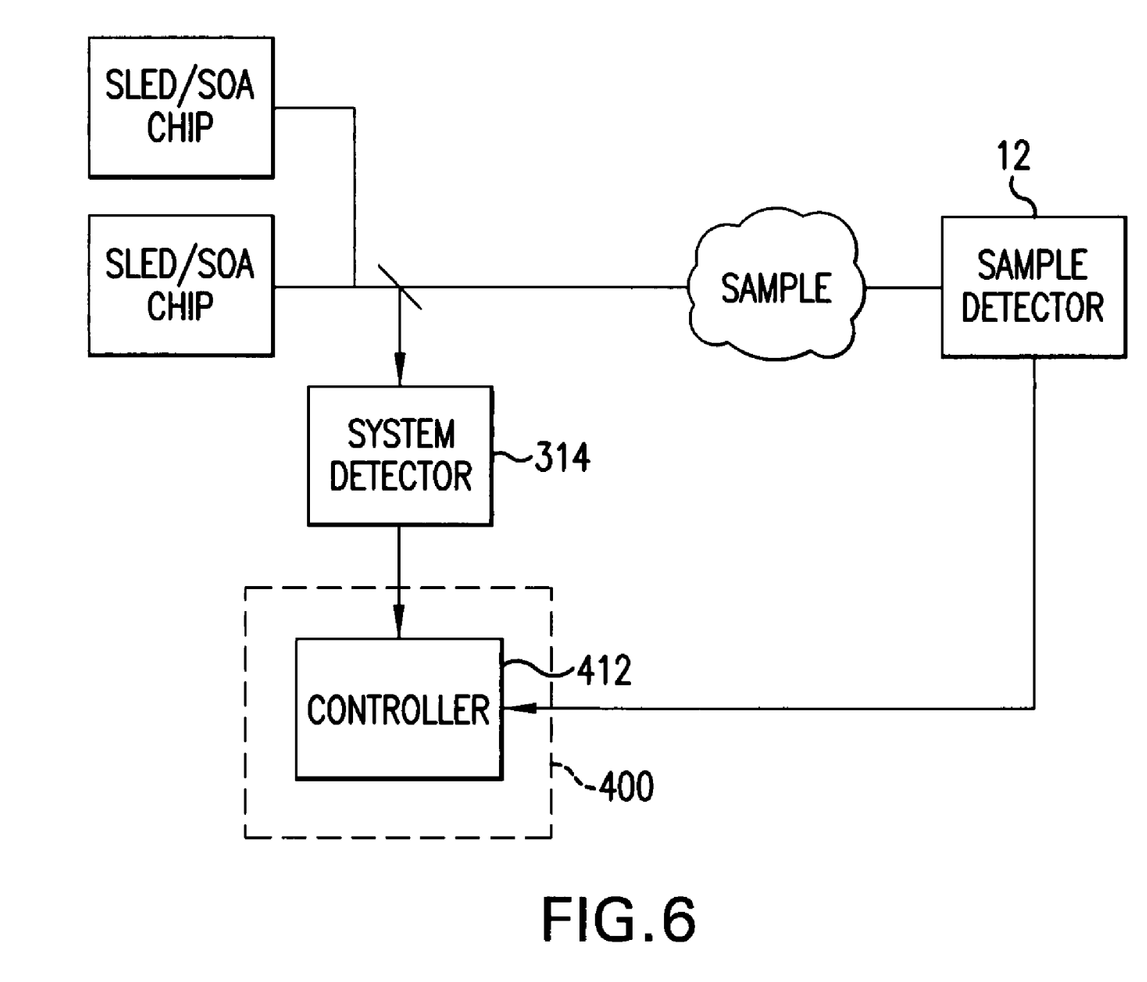
FIG. 6 shows spectral stitching system for a semiconductor source according to a third embodiment of the present invention, utilizing software-based baselining of the tunable optical signal.

FIG. 6 shows still another embodiment to the control system. Here the control system 400 comprises the system detector 314 or alternatively the source detectors 224. The signal from the detector is then used to modify the sampled signal detected by the sample detector 12. Specifically, the signal from the sample detector 12 is divided by the signal from the output signal detector 314 or source detectors 224. Specifically, an analog divider circuit in controller 400 is used in one embodiment. As a result, then the controller 440 generates a compensated sample signal after accounting for the variation in the tunable output signal as detected by the detector 314.

In another embodiment, this compensation is performed digitally. Specifically, analog to digital converters are used to sample the output from the output signal detector 314 and the sample detector 312. The controller then operates a software program that performs the compensation.

While this invention has been particularly shown and described with references to preferred embodiments thereof, it will be understood by those skilled in the art that various changes in form and details may be made therein without departing from the scope of the invention encompassed by the appended claims.

What is claimed is:

1. A multi semiconductor source tunable spectroscopy system, comprising:

at least two semiconductor sources for generating tunable optical signals being tunable over different spectral bands and being combined into an output signal that is tunable over a combined scan band produced from the different spectral bands of the at least two semiconductor sources; and a control system that compensates for spectral roll-off of the at least two semiconductor sources over the combined scan band provided by a combination of the at least two semiconductor sources, wherein the control system increases drive currents to each of the at least two semiconductor sources when wavelengths of the tunable optical signals approach limits of the spectral bands of the at least two semiconductor sources.

2. A system as claimed in claim 1, wherein the control system comprises at least one optical signal regulator for controlling an amplitude of the output signal over the combined scan band of the system.

3. A system as claimed in claim 1, wherein the control system comprises at least one source drive current circuit for controlling an amplitude of the output signal over the combined scan band of the system by regulating drive currents to the at least two semiconductor sources.

4. A system as claimed in claim 1, wherein the control system comprises:
    an output signal detector for detecting the output signal before interaction with a sample; and
    a controller that corrects a sample signal, which is produced by interaction of the output signal with the sample, in response to spectral roll-off detected by the output signal detector.

5. A system as claimed in claim 1, wherein the semiconductor sources are light emitting diodes generating broadband signals, which are converted to the tunable optical signals by at least one tunable filter.

6. A system as claimed in claim 5, wherein light emitting diodes and tunable filters are affixed to at least one optical bench.

7. A system as claimed in claim 5, wherein the at least one tunable filter is a Fabry-Perot tunable filter.

8. A system as claimed in claim 1, wherein the semiconductor sources include superluminescent light emitting diodes generating broadband optical signals, which are converted to the tunable optical signals by at least one tunable filter.

9. A system as claimed in claim 8, wherein superluminescent light emitting diodes and tunable filters are affixed to at least one optical bench.

10. A system as claimed in claim 8, wherein the at least one tunable filter is a Fabry-Perot tunable filter.

11. A system as claimed in claim 1, wherein the semiconductor sources are lasers comprising:
    laser cavities;
    semiconductor optical amplifiers that are located within the laser cavities, and tunable filters that are located within the laser cavities.

12. A system as claimed in claim 11, wherein semiconductor optical amplifiers and tunable filters are affixed to at least one optical bench.

13. A system as claimed in claim 12, wherein the laser cavities are linear cavities.

14. A system as claimed in claim 12, wherein the laser cavities are ring cavities.

15. A system as claimed in claim 12, wherein the tunable filters are microelectromechanical Fabry-Perot tunable filters.

16. A system as claimed in claim 1, wherein the control system controls a drive current to the at least two semiconductor sources as a function of a wavelength of the tunable optical signals.

17. A system as claimed in claim 1, wherein the control system increases drive currents to each of the at least two semiconductor sources when wavelengths of the tunable optical signals approach limits the spectral bands of the at least two semiconductor sources to stabilize a power of the tunable optical signals over the combined scan band.

* * * * *